US009941669B2

(12) United States Patent
Gautier et al.

(10) Patent No.: US 9,941,669 B2
(45) Date of Patent: Apr. 10, 2018

(54) PROTECTION DEVICE CARTRIDGE OF AN ELECTRICAL INSTALLATION WITH INTERSECTED CONNECTORS

(71) Applicant: ABB FRANCE, Cergy Saint Christophe (FR)

(72) Inventors: Boris Gautier, Lourdes (FR); Stephane Brescon, Bagneres de Bigorre (FR)

(73) Assignee: ABB Schweiz AG, Baden (CH)

( * ) Notice: Subject to any disclaimer, the term of this patent is extended or adjusted under 35 U.S.C. 154(b) by 202 days.

(21) Appl. No.: 14/814,427

(22) Filed: Jul. 30, 2015

(65) Prior Publication Data

US 2016/0036202 A1 Feb. 4, 2016

(30) Foreign Application Priority Data

Aug. 1, 2014 (FR) .................................... 14 57489

(51) Int. Cl.

| | |
|---|---|
| ***H02G 13/00*** | (2006.01) |
| ***H01C 7/12*** | (2006.01) |
| ***H01T 4/02*** | (2006.01) |
| ***H01T 4/06*** | (2006.01) |
| ***H01C 1/01*** | (2006.01) |
| ***H01C 1/014*** | (2006.01) |

(Continued)

(52) U.S. Cl.

CPC ................ *H01T 4/02* (2013.01); *H01C 1/01* (2013.01); *H01C 1/014* (2013.01); *H01C 7/126* (2013.01); *H01R 12/7076* (2013.01); *H01T 4/06* (2013.01); *H01R 9/2641* (2013.01)

(58) Field of Classification Search

CPC ......... H01T 4/02; H01T 4/12; H01R 12/7076; H01C 7/126; H01C 7/12; H02G 13/00; H02G 13/80

USPC .......................................................... 361/117

See application file for complete search history.

(56) References Cited

FOREIGN PATENT DOCUMENTS

| | | | |
|---|---|---|---|
| EP | 2432089 | A2 | 3/2012 |
| FR | 2490411 | A1 | 3/1982 |
| WO | WO2012/130192 | * | 10/2012 |

* cited by examiner

*Primary Examiner* — Dharti Patel

(74) *Attorney, Agent, or Firm* — Cantor Colburn LLP

(57) ABSTRACT

A protection device cartridge of an electrical installation intended to be brought on a base including an active protection component having a first terminal and a second terminal; a first connector forming a first electrical circuit portion electrically connected to the first terminal and to a first bearing portion of the base and a second connector forming a second electrical circuit portion electrically connected to the second terminal and to a second bearing portion of the base, the first connector and the second connector being arranged to allow the connection of the cartridge on the base according to an insertion direction, the first bearing portion and the second portion presenting a spacing determined according to the direction transverse to the insertion direction, where the second bearing portion is disposed between a first end point of the first electric circuit portion and the first bearing portion according to the direction transverse to the insertion direction and where the first bearing portion is disposed between the second bearing portion and a second end point of the second electrical circuit portion according to the direction transverse to the insertion direction, the first end point and the second end point presenting a determined spacing, greater than the spacing between the first bearing portion and the second bearing portion.

10 Claims, 2 Drawing Sheets

(51) Int. Cl.

| | |
|---|---|
| ***H01R 12/70*** | (2011.01) |
| *H01R 9/26* | (2006.01) |

PROTECTION DEVICE CARTRIDGE OF AN ELECTRICAL INSTALLATION WITH INTERSECTED CONNECTORS

CROSS REFERENCE TO RELATED APPLICATION

This application is related to and claims the benefit of French Patent Application Number 14/57489 filed on 1 Aug. 2014, the contents of which are herein incorporated by reference in their entirety.

TECHNICAL FIELD

The present invention relates to the protection of electrical installations and more specifically to the connection of a cartridge comprising an active protection component to the electrical circuit.

BACKGROUND

The active component of a lightning arrester can be a varistor or spark gap. The varistors, or current variable resistors are composed of zinc oxide assembled by sintering in the shape of a ceramic block. A varistor block has a nonlinear voltage/current characteristic: beyond a certain voltage threshold, the impedance of the varistor drops to allow the evacuation of the current responsible of the overvoltage. When the voltage returns to its normal level, the impedance of the varistor resumes its value at the standby state.

The spark gaps are in turn constituted of two electrodes facing one another in any medium (ambient air or specific gas). Beyond a certain value of current voltage, an electrical arc is established between the electrodes, which allows to evacuate the overvoltage.

In a lightning arrester, the spark gap or the varistor are frequently disposed in a cartridge also comprising two connectors, electrically connected to the electrical installation to be protected.

When a very high current intensity flows through the electrical circuit, electromagnetic forces are generated and can cause the tearing of the cartridge. It is known from the prior art to mechanically reinforce the connection between the cartridge and the electrical installation in order to overcome the forces leading to the tearing of the cartridge. The risk of tearing is thus reduced but not canceled. In addition, the mechanical reinforcements of the connections between the cartridge and the electrical circuit are expensive and generate a lengthening of the cartridge replacement duration.

BRIEF SUMMARY

The present invention aims to resolve all or part of the drawbacks mentioned above.

To this end, the present invention concerns a protection device cartridge of an electrical installation intended to be brought on a base, the protection device cartridge comprising:

- a protection active component comprising a first terminal and a second terminal;
- a first connector forming a first electrical circuit portion electrically connected to the first terminal and a second connector forming a second electrical circuit portion electrically connected to the second terminal, the first portion of the electrical circuit being intended to be electrically connected to the base by means of a first bearing portion and the second electrical circuit portion being intended to be electrically connected to the base by means of a second bearing portion, the first connector and the second connector being arranged to allow the connection of the protection device cartridge on the base according to an insertion direction, the first bearing portion and the second bearing portion presenting a spacing determined according to a direction transverse to the insertion direction, characterized in that the first electrical circuit portion comprises a first end point according to the direction transverse to the insertion direction and the second portion of the electrical circuit comprises a second end point according to the direction transverse to the insertion direction, the first end point and the second end point presenting a spacing determined according to the direction transverse to the insertion direction, greater than the spacing according to the direction transverse to the insertion direction between the first bearing portion and the second bearing portion, in that the first bearing portion is disposed between the second bearing portion and the second end point according to the direction transverse to the insertion direction, and in that the second bearing portion is disposed between the first end point and the first bearing portion according to the direction transverse to the insertion direction.

Thanks to the dispositions according to the invention, the electrical flow flowing through the circuit portion of the base and passing through the active component by means of connectors induces magnetic fields between the cartridge and the base which thereby attract one another. Thus, the tearing phenomena of the cartridge during the passage of a high intensity current in the circuit are avoided or limited, the cartridge is on the contrary attracted towards the base. The mechanical reinforcements of the connections between the cartridge and the base are no longer necessary.

According to the dispositions of the cartridge according to the invention, by direction transverse to the insertion direction is meant a direction oriented according to an angle comprised between 45° and 90° with respect to the insertion direction.

Preferably, the direction transverse to the insertion direction is a direction oriented according to an angle comprised between 60° and 90° with respect to the insertion direction.

Preferably, the direction transverse to the insertion direction is a direction oriented according to an angle comprised between 80° and 90° with respect to the insertion direction.

Preferably, the direction transverse to the insertion direction is a direction oriented perpendicular with respect to the insertion direction.

Following optional characteristics of the cartridge according to the invention:

- a first segment of the first connector, defined between the first end point and the second bearing portion, and a second segment of the second connector, defined between the first bearing portion and the second end point, are transversely oriented with respect to the insertion direction, by transversely oriented is meant an orientation according to an angle comprised between 45° and 90°;
- preferably, the first segment and the second segment are oriented according to an angle comprised between 60° and 90° with respect to the insertion direction;
- preferably, the first segment and the second segment are oriented according to an angle comprised between 80° and 90° with respect to the insertion direction;

preferably, the first segment and the second segment are perpendicularly oriented with respect to the insertion direction;

the first bearing portion and the second bearing portion of are oriented according to an angle comprised between 0° and 45° with respect to the insertion direction;

preferably the first bearing portion and the second bearing portion are oriented according to an angle comprised between 0° and 30° with respect to the insertion direction;

preferably the first bearing portion and the second bearing portion are oriented according to an angle comprised between 0° and 10° with respect to the insertion direction;

preferably, the first bearing portion and the second bearing portion are oriented in parallel with respect to the insertion direction;

for example, the bearing portions are pins;

the first connector intersects the second connector in an intersection area at which the first connector is located in a plane offset with respect to a plane in which the second connector is located;

the intersection area is comprised between the first bearing portion and the second bearing portion in the direction transverse to the insertion direction;

for example, the bearing portions are pins;

the active protection element is selected in the group comprising a spark gap and a varistor.

The invention also relates to a protection device of an electrical installation comprising a protection device cartridge in accordance with any one of the aforementioned characteristics and a base comprising a first electrical circuit range and a second electrical circuit range, the protection device cartridge being able to be electrically connected to the first range by means of a first electrical contact and to the second range by means of a second electrical contact.

According to one aspect of the protection device of an electrical installation according to the invention, the first and second electrical circuit ranges of the base are able to be traversed by an electrical flow in a determined direction.

Following optional characteristics of the protection device of an electrical installation according to the invention:

the first electrical circuit portion is electrically connected to the second electrical contact by mans of the first bearing portion, and the second electrical circuit portion is electrically connected to the first electrical contact by means of the second bearing portion;

the first segment of the first connector extends facing the first range and the second segment of the second connector extends facing the second range;

the first range and the second range are transversely oriented with respect to the insertion direction of the cartridge, by transversely oriented is meant an orientation according to an angle comprised between 45° and 90°;

preferably, the first range and the second range are oriented according to an angle comprised between 60° and 90° with respect to the insertion direction;

preferably, the first range and the second range are oriented according to an angle comprised between 80° and 90° with respect to the insertion direction;

preferably, the first range and the second range are perpendicularly oriented with respect to the insertion direction;

the first electrical contact comprises a first elastic contact device and the second electrical contact comprises a second elastic contact device, the first bearing portion being able to bear against the second elastic contact device and the second bearing portion being able to bear against the first elastic contact device;

the protection device cartridge is able to be connected to the base in a removable manner;

the distance between the first and second segments of the first and second connectors and the first and second ranges of the base is variable.

BRIEF DESCRIPTION OF THE DRAWINGS

Other characteristics and advantages of the present invention will appear in the light of the description which will follow and with the examination of the appended figures, in which.

DETAILED DESCRIPTION

On all of these figures, identical or similar references designate identical or similar members or sets of members.

Figure 1:
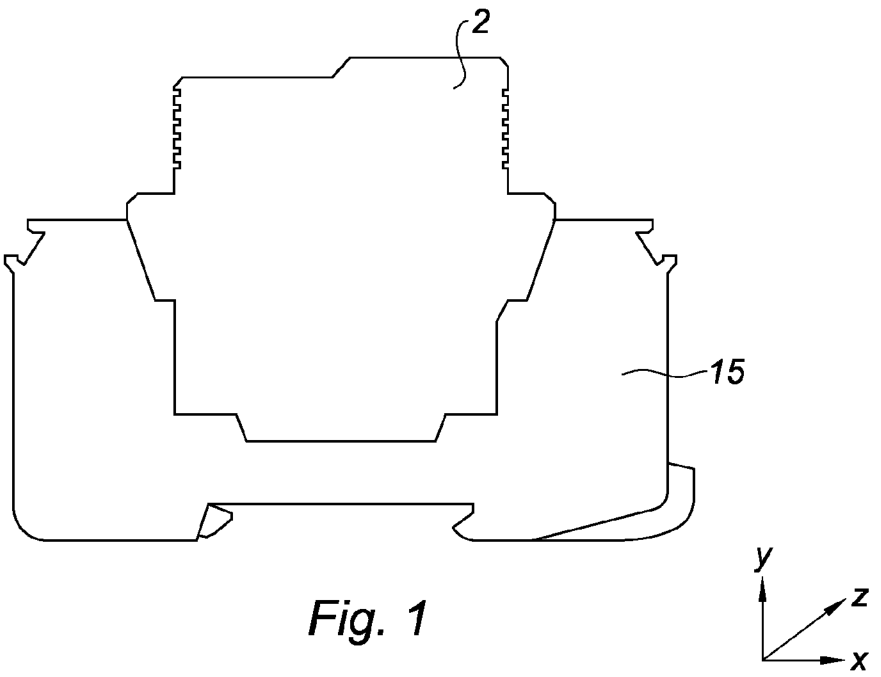
FIG. 1 represents a protection device of an electrical installation.

On FIG. 1 a protection device of an electrical installation in case of high overvoltage, for example in case of lightning, is represented. This protection device comprises a base 15 on which a protection device cartridge 2 called cartridge 2 is removably connected.

Figure 2:
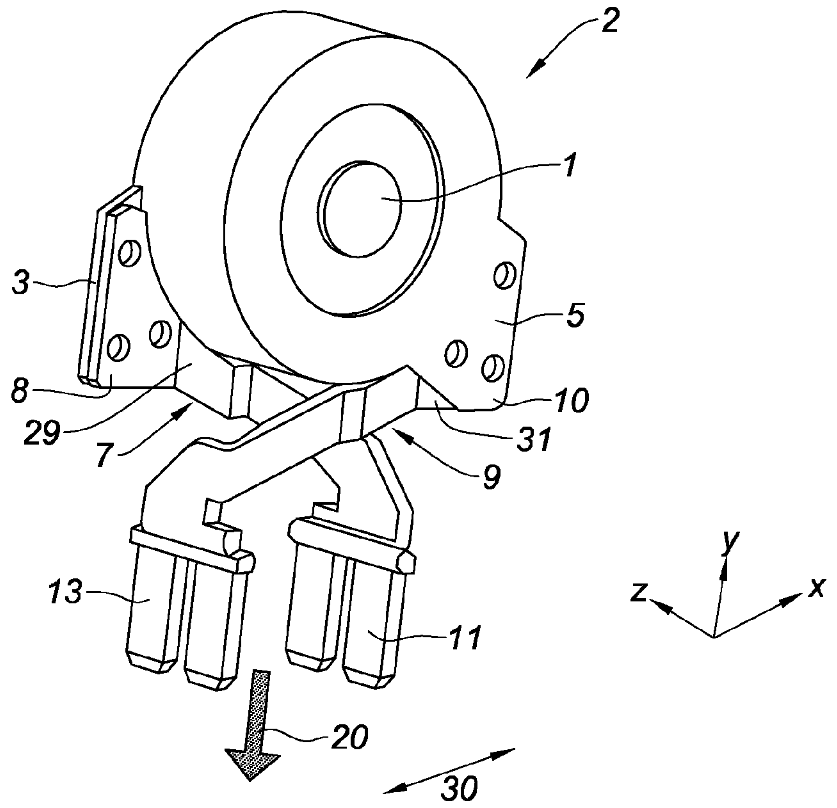
FIG. 2 represents an active protection component on which two connectors are brought.

The elements disposed in the cartridge 2 are represented in FIG. 2. The cartridge 2 comprises an active component, here a varistor 1, a first connector 7 forming a first electrical circuit portion and a second connector 9 forming a second electrical circuit portion. The active component can also be for example a spark gap. The varistor 1 comprises two terminals 3, 5 to which the electrical circuit portions of the connectors 7, 9 are connected. At a first end, the connector 7 is connected to the varistor 1 by the terminal 3. At a second end, the connector 7 comprises a bearing portion, here a pin 11 intended to come in contact with the base 15. At a first end, the connector 9 is connected to the varistor 1 by the terminal 5. At a second end, the connector 9 comprises a bearing portion, here a pin 13 intended to come into contact with the base 15. The first electric circuit portion comprises a first end point 8 and the second electrical circuit portion comprises a second end point 10.

Figure 3:
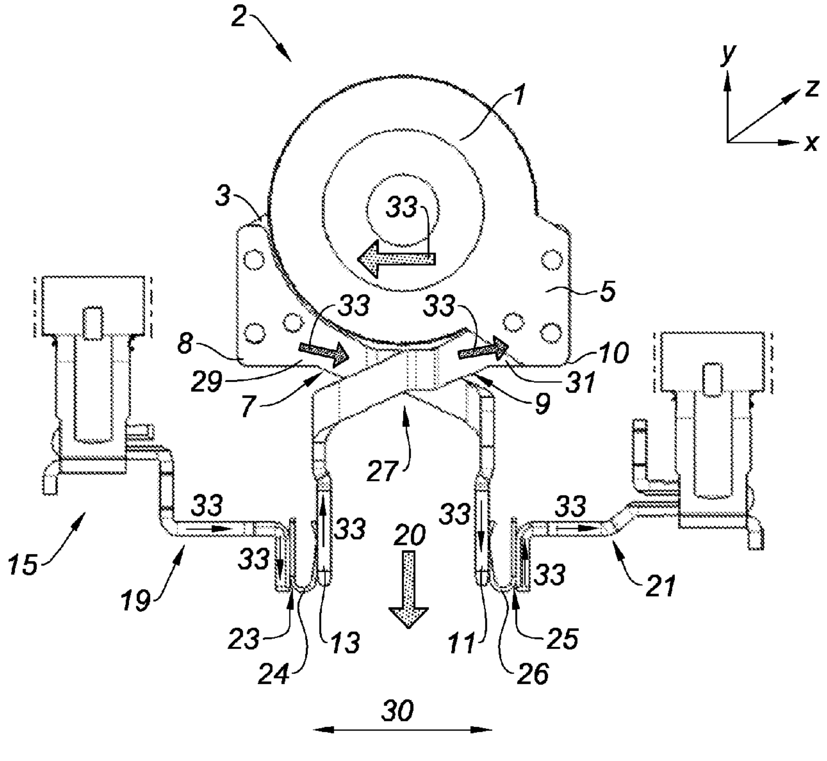
FIG. 3 represents an active protection component on which two connectors are brought and which are electrically connected to a base.

The base 15 is represented in FIG. 3. The base 15 comprises a first range 19 and a second range 21. The first range 19 comprises an electrical contact 23 and the second range 21 comprises an electrical contact 25.

The cartridge 2 is able to be removably brought on the base 15. Indeed, the pins 11 and 13 are arranged to be electrically connected to the electrical contacts 23 and 25 of the ranges 19 and 21 of the base 15.

The electrical contacts 23, 25 each comprise an elastic contact device 24, 26, ensuring the electrical connection between the electrical contacts 23, 25 and the pins 11, 13. In addition, the establishment and the removal of the cartridge 2 in the base 15 is facilitated by these elastic contact devices 24, 26.

The cartridge is able to be brought on the base according to an insertion direction 20, substantially parallel to the pins 11, 13.

According to a direction 30 transverse to the insertion direction 20, the electrical contacts 23 and 25 present a spacing which is smaller than the spacing present between the end points 8 and 10 of the electric circuit portions of the connectors 7, 9.

The pin 11 of the connector 7 is disposed between the pin 13 and the end point 10 according to the direction 30 transverse to the insertion direction 20. The pin 11 is electrically connected to the electrical contact 23 of the range 19. The pin 13 of the connector 9 is disposed between the end point 8 and the pin 11 according to the direction 30 transverse to the insertion direction 20. The pin 13 is electrically connected to the electrical contact 25 of the range 21. The connectors 7 and 9 intersect at an intersection area 27. At the intersection area 27, the connectors 7, 9 present an offset according to the axis z. The terminals 3 and 5 of the active component 1 present substantially the same offset according to the axis z.

A first segment 29 of the connector 7 defined between the end point 8 and the pin 13 extends facing the range 19 of the base 15. The orientation of the segment 29 is substantially transverse to the insertion direction 20.

A segment 31 of the connector 9 defined between the pin 11 and the end point 10 extends facing the range 21 of the base 15. The orientation of the segment 31 is substantially transverse to the insertion direction 20.

Thus, during a high rise of the voltage at the cartridge, the current is able to flow through the varistor 1. The current circulation is represented by the arrows 33. A very high current intensity therefore flows through the first range 19 of the base 15, passes by the electrical contact 23 then reaches the cartridge by the pin 13. The current flows through the electric circuit portion of the connector 9, passes through the varistor 1 then flows through the electrical circuit portion of the connector 7 till the pin 11. The current then passes through the electrical contact 25 to join the range 21 of the base 15. Magnetic fields are induced by the current circulation on the one hand in the ranges 19, 21 and in the portions 29, 31 of the connectors 7, 9 on the other hand. These magnetic fields generate an attraction according to the insertion direction 20 between the portion 29 of the connector 7 and the range 19 of the base 15 on the one hand, and between the portion 31 of the connector 9 and the range 21 of the base 15 on the other hand.

During the passage of a high intensity current, the pin 13 and the electrical contact 23 on the one hand, and the pin 11 and the electrical contact 25 on the other hand, repel each other. The elastic contact devices 24, 26 allow to ensure the electrical contact between the base 15 and the cartridge 2 even in the case of the passage of a high intensity current.

The tearing phenomena due to the currents circulation of opposite directions between the portions 29, 31 of the attachment elements 7, 9 and the ranges 19, 21 of the base 15 are thus avoided or limited.

Of course, the present invention is not limited to the described and represented embodiment, provided as an illustrative and non-limiting example. For example, the distance between the attachment elements 7, 9 and the ranges 19, 21 of the base 15 can be modified in order to obtain a more or less strong attraction between the cartridge 2 and the base 15 in case of overvoltage.

The invention claimed is:

1. A protection device cartridge of an electrical installation intended to be brought on a base, the protection device cartridge comprising:

an active protection component comprising a first terminal and a second terminal;

a first connector forming a first electrical circuit portion electrically connected to the first terminal and a second connector forming a second electrical circuit portion electrically connected to the second terminal, the first electrical circuit portion being intended to be electrically connected to the base by means of a first bearing portion and the second electrical circuit portion being intended to be electrically connected to the base by means of a second bearing portion, the first connector and the second connector being arranged to allow the connection of the protection device cartridge on the base according to an insertion direction, the first bearing portion and the second bearing portion presenting a spacing determined according to a direction transverse to the insertion direction, wherein the first electrical circuit portion comprises a first end point according to the direction transverse to the insertion direction and the second electrical circuit portion comprises a second end point according to the direction transverse to the insertion direction, the first end point and the second end point presenting a spacing determined according to the direction transverse to the insertion direction, greater than the spacing according to the direction transverse to the insertion direction between the first bearing portion and the second bearing portion, wherein the first bearing portion is disposed between the second bearing portion and the second end point according to the direction transverse to the insertion direction, and wherein the second bearing portion is disposed between the first end point and the first bearing portion according to the direction transverse to the insertion direction, wherein a first segment of the first connector defined between the first end point and the second bearing portion, and a second segment of the second connector, defined between the first bearing portion and the second end point are transversely oriented with respect to the insertion direction.

2. The protection device cartridge according to claim 1, wherein the first bearing portion and the second bearing portion are oriented according to an angle comprised between 0° and 45° with respect to the insertion direction.

3. The protection device cartridge according to claim 1, wherein the first connector intersects the second connector in an intersection area at which the first connector is located in a plane offset with respect to a plane wherein the second connector is located.

4. The protection device cartridge according to claim 3, wherein the intersection area is between the first bearing portion and the second bearing portion in the direction transverse to the insertion direction.

5. A protection device of an electrical installation comprising a protection device cartridge in accordance with claim 1 and a base comprising a first range of electrical circuit and a second range of electrical circuit, the protection device cartridge being electrically connected to the first range by means of a first electrical contact and to the second range by means of a second electrical contact.

6. The protection device according to claim 5, wherein the first electrical circuit portion is electrically connected to the second electrical contact by means of the first bearing portion, and the second electric circuit portion is electrically connected to the first electrical contact by means of the second bearing portion.

7. The protection device according to claim 5, wherein the first segment of the first connector extends facing the first range and the second segment of the second connector extends facing the second range.

8. The protection device according to claim 5, wherein the first range and the second range are transversely oriented with respect to the insertion direction of the cartridge.

9. The protection device according to claim 5, wherein the first electrical contact comprises a first elastic contact device and the second electrical contact comprises a second elastic contact device, the first bearing portion being adapted to bear against the second elastic contact device and the second bearing portion being adapted to bear against the first elastic contact device.

10. The protection device according to claim 5, wherein the protection device cartridge is connected to the base in a removable manner.

* * * * *